US008517070B2

(12) United States Patent  
Bolzoni et al.

(10) Patent No.: US 8,517,070 B2
(45) Date of Patent: Aug. 27, 2013

(54) PNEUMATIC TYRE (75) Inventors: Roberto Bolzoni, Milan (IT); Roberto Sangalli, Milan (IT); Dario Scaltritti, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 375 days.

(21) Appl. No.: 12/741,367

(22) PCT Filed: Nov. 5, 2007

(86) PCT No.: PCT/IT2007/000774
§ 371 (c)(1),
(2), (4) Date: Aug. 4, 2010

(87) PCT Pub. No.: WO2009/060476
PCT Pub. Date: May 14, 2009

(65) Prior Publication Data
US 2010/0294409 A1 Nov. 25, 2010

(51) Int. Cl.
*B60C 11/12* (2006.01)
*B60C 11/03* (2006.01)

(52) U.S. Cl.
USPC ............. 152/209.18; 152/209.8; 152/209.9

(58) Field of Classification Search
USPC .......... 152/154.2, 209.1, 209.3, 209.8, 209.9, 152/209.16, 209.17, 209.18, 209.25, 902, 152/209.28
See application file for complete search history.

(56) References Cited

U.S. PATENT DOCUMENTS

| 5,423,364 | A | 6/1995 | Himuro | |
|---|---|---|---|---|
| 6,142,200 | A * | 11/2000 | Feider et al. | 152/209.14 |
| 7,028,733 | B2 * | 4/2006 | Ratliff, Jr. | 152/209.15 |
| 8,413,695 | B2 * | 4/2013 | Shibano | 152/209.17 |
| 2006/0137791 | A1 | 6/2006 | Miyabe et al. | |
| 2007/0151646 | A1 * | 7/2007 | Ito | 152/209.25 |

FOREIGN PATENT DOCUMENTS

| EP | 0 565 270 A1 | 10/1993 |
|---|---|---|
| EP | 0 661 178 A2 | 7/1995 |
| EP | 1 614 549 A1 | 1/2006 |
| WO | WO-2006/007877 A1 | 1/2006 |

OTHER PUBLICATIONS

International Search Report from the European Patent Office for International Application No. PCT/IT2007/000774 (Mail date Jul. 23, 2008).

* cited by examiner

*Primary Examiner* — Eric Hug
(74) *Attorney, Agent, or Firm* — Finnegan, Henderson, Farabow, Garrett & Dunner, L.L.P.

(57) ABSTRACT

A pneumatic tyre for a car having a tread, including a central portion disposed astride an equatorial plane and two shoulder portions. The central portion is separated from the tread shoulder portions by two circumferential grooves and at least one circumferential row, included between a first and a second circumferential groove, is present in the central portion. The tread has a hollow/solid ratio lower than 0.28. The circumferential row comprises transverse grooves extending over at least 80% of the width of the circumferential row. Each transverse groove includes a median line having at least one first rectilinear stretch and one curvilinear stretch. The transverse grooves have a smaller width than that of the circumferential grooves.

32 Claims, 7 Drawing Sheets

PNEUMATIC TYRE

CROSS REFERENCE TO RELATED APPLICATION

This application is a national phase application based on PCT/IT2007/000774, filed Nov. 5, 2007, the content of which is incorporated herein by reference.

BACKGROUND OF THE INVENTION

1. Field of the Invention

The present invention relates to a pneumatic tyre for a car. In particular a pneumatic tyre for High Performance cars and SUV's (Sport Utility Vehicles).

2. Description of the Related Art

Optimal characteristics in terms of traction and braking, as well as handling on dry and wet road surfaces are usually required from tyres of this class, in addition to a satisfactory resistance to wear.

Tyres for motor-vehicles are known which have a tread provided with blocks delimited by circumferential grooves extending in a substantially longitudinal direction, and transverse grooves extending in a substantially axial direction. The blocks resulting from interlacing of these grooves are shaped according to different conformations suitably studied and are disposed in circumferential side-by-side rows each of which is included between two successive circumferential grooves.

The circumferential grooves can affect the features concerning the tyre's steering property and steadiness on running in relation to the lateral (slip) thrusts directed parallel to the rotation axis of the tyre.

The transverse grooves, in turn, can affect the traction ability features of the tyre, i.e. the capability of transmitting to the road surface the tangential thrusts parallel to the running direction, during the acceleration and breaking steps of the vehicle.

The circumferential and transverse grooves can also affect water draining in the contact area with the road surface (footprint area) during running on a wet road surface.

WO 2006-007877 in the name of the same Applicant, proposes a tyre the tread band of which has at least one first and one second circumferential groove separating a central portion from two shoulder portions. A circumferential cut is formed some distance from at least one of the circumferential grooves.

The tread band is crossed by transverse grooves distributed according to circumferentially repeated modules, each of which in at least one shoulder portion has a main groove with a first substantially rectilinear segment inclined at an angle included between 3° and 10° relative to a radial plane of the tyre, a second substantially rectilinear segment extending between the circumferential cut and the first circumferential groove at an angle just as an indication included between 105° and 130° relative to the radial plane, and a curvilinear connecting segment between the first and second segments.

SUMMARY OF THE INVENTION

The Applicant has noticed that a high number of transverse grooves of important width improves traction above all on wet road surfaces, and ensures good flexibility to the block itself, but an excessive use of same can impair performance on dry road surfaces and increase the tyre noise. In fact, one of the main noise causes is the continuous succession of impacts of the block corners on the road surface.

The Applicant has further noticed that the transverse grooves with an important width tend to structurally weaken the tread band, which will impair the easy drive qualities which are fundamental in a tyre also conceived for UHP (Ultra High Performance) uses.

It is the Applicant's firm belief that these easy drive qualities are particularly affected by the tread pattern structure in the regions close to the shoulder, i.e. the axially external portion of the tread band.

In fact, the Applicant could observe that stresses transmitted between tyre and road surface on getting over bends at high speed are more strongly felt at these outer shoulder regions.

In order to succeed in keeping a high safety level in all use conditions, particularly for High Performance cars and SUV's, the tyre must further have excellent braking qualities (both on dry and wet surfaces), but also be resistant to the aquaplane phenomenon; these two features oppose each other because a low hollow/solid ratio is required as regards braking, but a suitable number of grooves and above all a suitable width of the grooves is needed in order to ensure a good water draining.

The Applicant has further noticed that usually the depth of the transverse grooves in known tyres intended for high performance cars is generally reduced in summer tyres, as compared with winter tyres for example. On the other hand, it is the Applicant's firm belief that also for summer tyres the depth of the transverse grooves cannot be reduced too much, because it is directly connected with the resistance to the aquaplane and the long life of the tyre.

The Applicant has found that the above described mutually conflicting problems are solved by a tread pattern with a reduced hollow/solid ratio, comprising transverse grooves of reduced width and having a course adapted to ensure optimal traction/braking features both on a straight stretch and on a bend. In addition, the pattern can comprise a greater concentration of grooves dedicated to water discharge from the footprint area, in the axially intermediate and/or internal regions of the tyre.

In more detail, in one aspect the present invention relates to a pneumatic tyre for car having a tread comprising a central portion disposed astride an equatorial plane and two shoulder portions, the central portion being separated from the shoulder portions of the tread by two circumferential grooves, in the central portion at least one circumferential row included between two circumferential grooves being present, characterised in that said tread has a hollow/solid ratio lower than 0.28; said circumferential row comprises transverse grooves extending over at least 80% of the width of said circumferential row; each transverse groove comprising a median line having at least one first rectilinear stretch and one curvilinear stretch; said transverse grooves having a smaller width than that of the circumferential grooves.

In the present specification and in the following claims by "extension" of the transverse grooves it is intended the length of the projection of said groove on a straight line perpendicular to the equatorial plane crossing the circumferential row.

The low hollow/solid ratio together with the reduced size of the transverse grooves give a high structural consistency to the tread band in this region, so as to ensure excellent qualities of easy drive. In the present specification and in the following claims, by "hollow/solid" ratio it is intended the value of the ratio measurable in the footprint area S between the tread portions taken up by cuts and/or grooves (hollows), and therefore without physical contact with the ground, and the extension of the footprint area S itself.

The present invention, in said aspect, can have at least one of the preferred features hereinafter described.

Preferably, the median line has a second rectilinear stretch and the curvilinear stretch connects the first and second rectilinear stretches.

The second rectilinear stretch has a length smaller than or equal to one third of the length of the first stretch.

The transverse grooves have a maximum width smaller than or equal to 1.5 mm.

The transverse grooves extend from a circumferential groove to the axially adjacent one.

Said circumferential row comprises a row of blocks; each block of the row is axially delimited by a stretch of said circumferential grooves and is circumferentially confined by two consecutive transverse grooves. The reduced size of the transverse grooves enables said block row to work as a continuous surface offering an appropriate support of the tread band in the footprint area, so as to reduce the load weighing on the blocks thus limiting wear of same and the noise phenomena resulting from impact on the ground during rolling.

In order to obtain optimal traction/braking qualities when getting over a straight, the connecting stretch comprises an arc of a circumference having a preselected radius of curvature (R1) and defines a convexity oriented in a first circumferential direction.

In order to obtain optimal traction/braking qualities when running on a bend, the first rectilinear stretch extends over at least 40% of the width of the block and has a preselected inclination relative to said equatorial plane.

The block portion at the above described curvilinear stretch and at the second rectilinear stretch of smaller extension is that ensuring more traction/braking efficiency to the block on getting over a straight.

On the contrary, the rectilinear stretch of greater extension gives the block good flexibility, while at the same time ensuring braking/traction ability when the tyre is getting over a bend.

The second stretch has a direction substantially perpendicular to the equatorial plane.

In the present specification and in the following claims by "direction substantially perpendicular to the equatorial plane" it is intended a direction forming an angle with the equatorial plane included in the range of 75° to 105°.

The first rectilinear stretch, instead, forms an angle $\alpha$ relative to the equatorial plane that is smaller than or equal to 50°, preferably smaller than or equal to 40°.

In the present specification and in the following claims, each angle adapted to indicate the inclination of a groove, is intended to be calculated from the angle defined between a plane parallel to the equatorial plane passing through the axially closest circumferential groove and the plane to which said groove belongs.

According to another preferred aspect, the central portion of the tread has a second circumferential row included between two circumferential grooves; said circumferential row comprises transverse grooves extending over at least 80% of the width of the circumferential row; each transverse groove comprising a median line having a first rectilinear stretch and one curvilinear connecting stretch; these transverse grooves having a smaller width than that of the circumferential grooves.

The median line of the transverse grooves of the second circumferential row has a second rectilinear stretch and the curvilinear stretch connects said first and second rectilinear stretches.

Advantageously, the first and second rectilinear stretches of the second circumferential row have different lengths.

The first rectilinear stretch of the second circumferential row extends over at least 40% of the width of the circumferential row and has a preselected inclination relative to the equatorial plane.

The first rectilinear stretch forms an angle $\beta$ relative to the equatorial plane that is smaller than or equal to 50°; preferably smaller than or equal to 40°.

In a further advantageous aspect, the second stretch has a preselected inclination relative to said equatorial plane that is adapted to define an angle $\delta$ greater than 75°.

The connecting stretch of the second circumferential row comprises an arc of a circumference having a preselected radius of curvature (R2) and defines a concavity oriented in a second circumferential direction (M).

Said second circumferential direction is opposite to the first circumferential direction.

Advantageously, the transverse grooves of the second row have a maximum width smaller than or equal to 1.5 mm.

Preferably, the transverse grooves of the second circumferential row extend from one circumferential groove to the axially adjacent one.

The second circumferential row comprises a block row; each block of the second row is axially delimited by a stretch of the circumferential grooves and is circumferentially delimited by two consecutive transverse grooves.

In this case too, the block portion at the curvilinear stretch and at the second stretch substantially perpendicular to the equatorial plane, is that ensuring more traction/braking efficiency to the block on getting over a straight.

The first rectilinear stretch, i.e. the one of greater extension, on the contrary, gives the block good flexibility, at the same time ensuring braking/traction ability when the tyre is running on a bend.

Preferably, the width of said transverse grooves of the first and second rows is smaller than or equal to 1 mm.

In a still further preferred aspect, the central portion of the tread comprises at least one third circumferential row of blocks included between two circumferential grooves, each of said blocks being axially defined by a stretch of the circumferential grooves and being circumferentially defined by transverse grooves; the transverse grooves comprising a median line of substantially rectilinear course adapted to form an angle $\phi$ with the equatorial plane.

The transverse grooves of the third row extend from one circumferential groove to the axially adjacent one with a width greater than 1.5 mm, preferably smaller than 4 mm.

Preferably, the third row of blocks comprises a further groove adapted to divide the block into two sub-blocks; the further groove comprises a median line having a first and a second rectilinear stretch and a curvilinear connecting stretch joining the first and second rectilinear stretches together; the further groove having a width smaller than 1.5 mm.

Preferably, the circumferential grooves have a width included in the range of 5 to 16 mm, inclusive of the extremes.

The circumferential grooves have a depth included in the range of 5 to 11 mm.

The circumferential groove disposed at the axially external portion of the central portion (L1) of the tread has a smaller width than that of the circumferential grooves.

The smaller width of the axially external circumferential groove together with the preselected hollow/solid ratio of the axially external portion allows the tread to offer more support surface in this region which is particularly stressed on a bend, so as to increase the easy drive of the tyre.

Advantageously, the transverse grooves of the first and second circumferential rows have a depth reduction in a portion adjacent to at least one circumferential groove. This step-wise course of the transverse grooves makes the block rigid in the axial direction and reduces possible uneven-wear problems at the block corners.

The equatorial plane divides the tread into two half-regions, i.e. an axially internal half-region (L2) and an axially external half-region (L3) positioned on the outer side of said car when said tyre is mounted on the latter. The axially external half-region (L3) has a hollow/solid ratio lower than that of the axially internal half-region (L2). In particular, the axially internal half-region has a hollow/solid ratio lower than or equal to 0.29.

Preferably, the axially internal block row of the central portion (L1) of the tread has a hollow/solid ratio included in the range of 0.28 to 0.38.

According to another preferred embodiment, each shoulder portion is formed of at least one block row, each block of the row being circumferentially delimited by transverse grooves.

The transverse grooves have a median line of substantially rectilinear course, which is inclined relative to the equatorial plane so as to form an angle ω greater than 70° with the circumferential direction of the axially adjacent groove.

The tyre of the invention has a high grip on a wet road surface, very low noise values, high comfort level and optimal running behaviour on a dry road surface.

BRIEF DESCRIPTION OF THE DRAWINGS

Characteristics and advantages of the invention will be now illustrated with reference to embodiments shown by way of non-limiting example in the accompanying figures, in which.

DETAILED DESCRIPTION OF THE INVENTION

Figure 1:
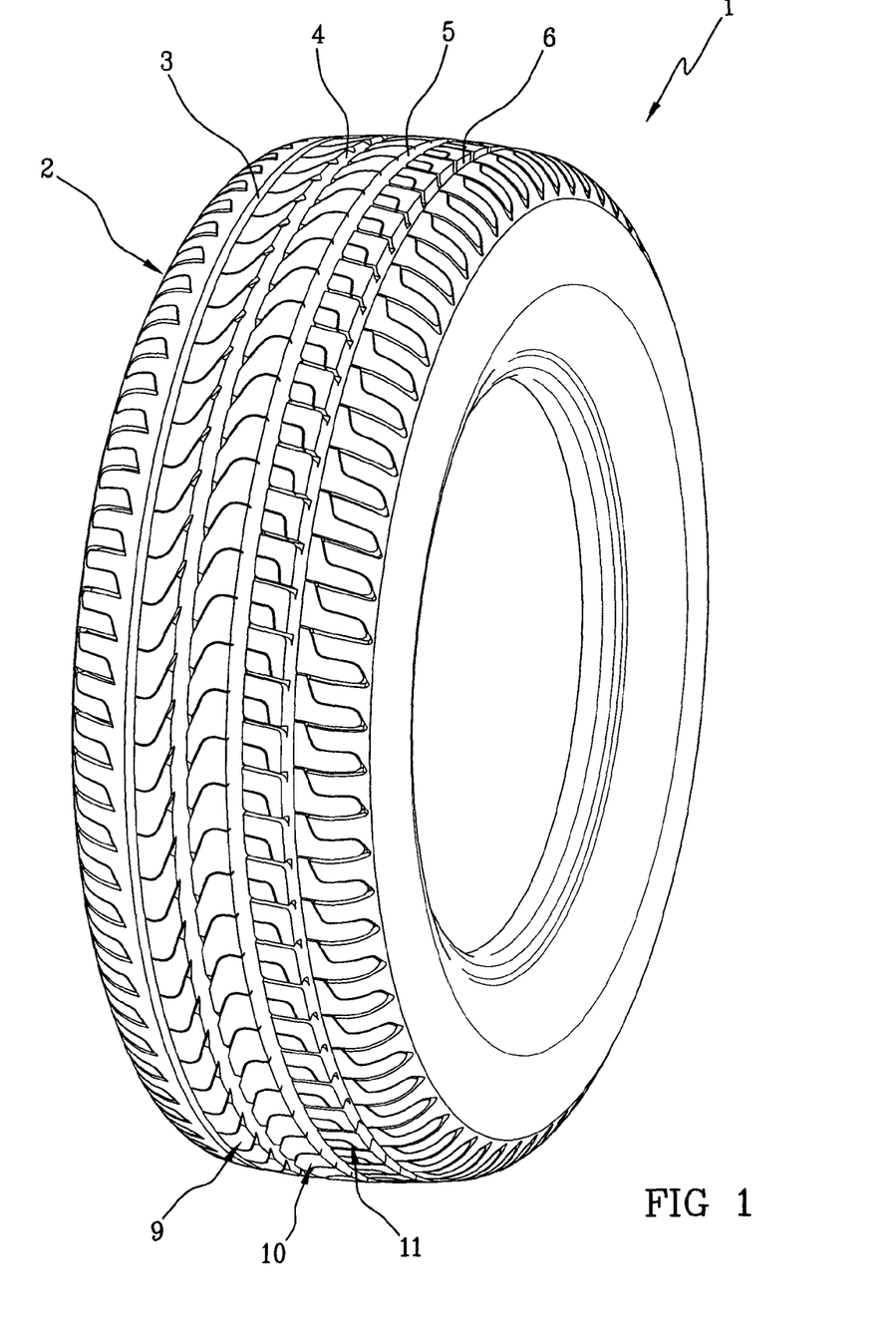
FIG. 1 is a perspective view of a pneumatic tyre having a tread manufactured according to an example of the invention.
Figure 2:
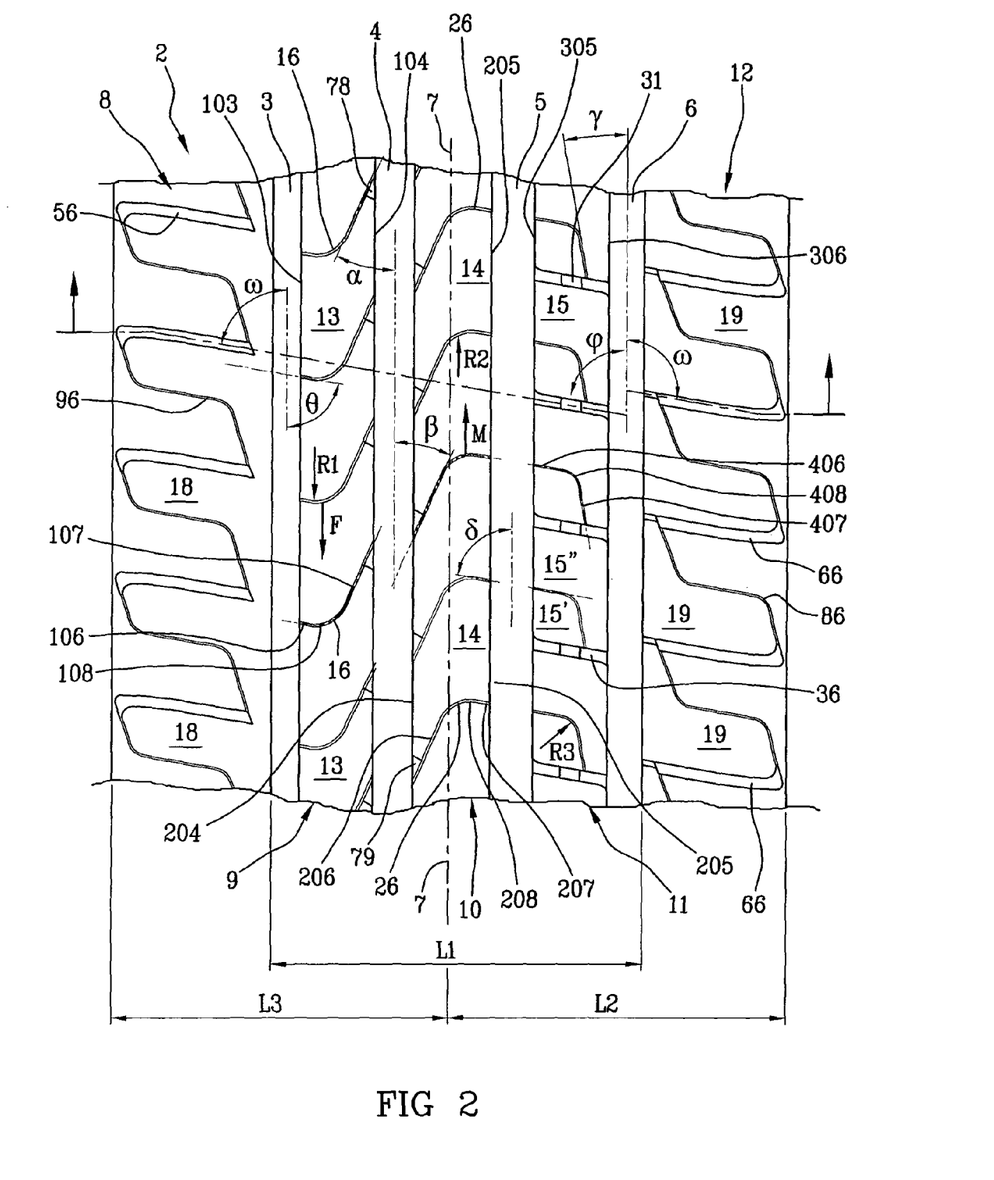
FIG. 2 is a plan view of the tyre tread seen in FIG. 1.
Figure 2A:
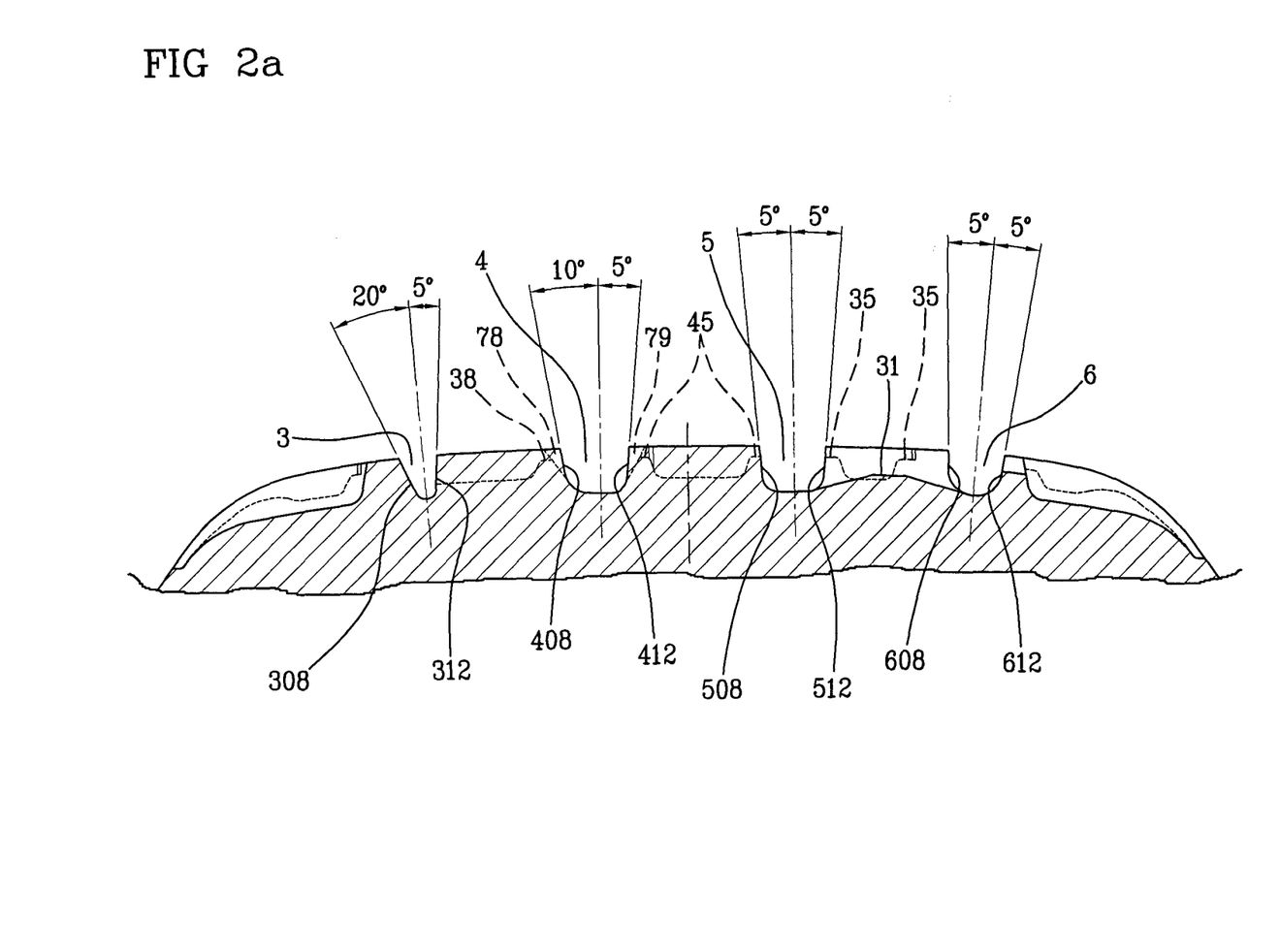
FIG. 2a is a plane view of the tyre tread seen in FIG. 1.

A tyre 1 having a first embodiment of the tread 2 in accordance with the invention is shown in FIGS. 1, 2, 2b.

The structure of tyre 1 is of conventional type and comprises a carcass, a tread band placed on the carcass crown, a pair of axially opposite sidewalls, terminating with beads reinforced with bead cores and respective bead fillers. The tyre preferably also comprises a belt structure interposed between carcass and tread band. The carcass is reinforced with one or more carcass plies anchored to the bead cores, while the belt structure comprises two belt strips radially overlapping one another. The belt strips are formed with rubberised fabric lengths incorporating metallic cords parallel to each other in each strip and crossed with the cords of the adjacent strips, preferably inclined in a symmetric manner relative to the equatorial plane. Preferably, the belt structure also comprises a third belt strip, at a radially outermost position, provided with cords oriented substantially parallel to the equatorial plane. The cords of the zero-degree belt are preferably textile cords and more preferably are made of a heat-shrinkable material. Tyre 1 preferably has a H/C ratio between the height of the right section and the maximum width of the section, that is included between 0.20 and 0.65.

Tread 2 has a pattern of the asymmetric type, i.e. it operates in a more efficient manner when tyre 1 is mounted on the car with a given orientation rather than with the opposite one. In other words, the tyre preferably has an inner sidewall (car side) and an outer sidewall.

To ensure the tyre a long life (kilometres run) and at the same time high performance over all its life, in particular as regards easy drive, the tread 2 has a reduced hollow/solid ratio, i.e. lower than 0.28, preferably lower than 0.27 and equal to about 0.25, for example.

Tread 2 is provided with circumferential grooves 3, 4, 5 and 6 (FIG. 3), extending in longitudinal direction and parallel to the equatorial plane 7 of the tyre.

Tread 2 comprises a central portion L1 and two shoulder portions 8, 12. The central portion L1 has three circumferential rows 9, 10, 11, a central one and two side rows, 9 and 11. The shoulder portion 8 is separated from row 9 by the circumferential groove 3. Row 9 is included between the circumferential grooves 3 and 4. Row 10 is included between the circumferential grooves 4 and 5. Row 11 is included between the circumferential grooves 5 and 6. The shoulder portion 12 is separated from the block row 11 by groove 6.

The circumferential grooves 3, 4, 5 and 6 have a width ranging from about 5 mm to about 16 mm. The circumferential grooves 3, 4, 5 and 6 have a depth ranging from about 5 mm to about 11 mm.

Preferably, the axially outermost circumferential groove 3 of the tread has a smaller width than that of grooves 4, 5, 6, so as to allow tread 2 to offer more support surface when running on a bend, thus increasing handling of the tyre.

In detail, the width of the circumferential groove 3 can be included in the range between 5 and 10.5 mm. The circumferential grooves 4 and 5, instead, are those having the greatest width, included between 9 and 16 mm. The axially innermost circumferential groove 6 can, instead, have an intermediate width between 7 and 11 mm. The circumferential groove 3 can have a depth smaller than 10 mm, preferably greater than 5 mm, equal to 8 mm for example.

Alternatively, all the circumferential grooves could have the same width and/or depth without departing from the protection scope of the present invention.

As shown in FIG. 2b, the side wall 308 of the circumferential groove has an inclination of about 20° relative to its mid-line axis, while the opposite wall 312 has an inclination of about 5° relative to the mid-line axis of the same groove 3.

The circumferential groove 4 has a depth smaller than 10 mm, preferably greater than 5 mm, more preferably equal to 8.5 mm. The side wall 408 of the circumferential groove 4 has an inclination of about 10° relative to its mid-line axis, while the opposite sidewall 412 can have an inclination of about 5° relative to the mid-line axis.

The circumferential groove 5 can have the same depth as groove 4 and side walls 508, 512 with inclinations that are symmetrical mirror images of each other.

In detail, the side wall 508, as well as side wall 512, of the circumferential groove 5 have an inclination of about 5° relative to their mid-line axes.

Finally, the circumferential groove 6 can have a depth smaller than 10 mm, preferably greater than 5 mm, equal to 8 mm, for example. The side wall 608 of the circumferential groove 6 has an inclination of about 5° relative to its mid-line axis. Wall 612 has the same inclination of about 5° relative to the mid-line axis.

The side walls of grooves 3, 4, 5, 6 could have different inclinations relative to their mid-line axes as compared with those mentioned above without departing from the protection scope of the present invention.

As previously mentioned, the circumferential grooves 3, 6 separate the central portion L1 of the tread from the shoulder portions 8, 12, while the circumferential grooves 4, 5 divide the central portion L1 of the tread into circumferential rows 9, 10, 11.

The equatorial plane 7 divides tread 2 into two half-regions, an axially internal half-region L2 and an axially external half-region L3, positioned on the outer side of a car when tyre 1 is mounted on said car.

The axially external half-region L3 has a hollow/solid ratio greater than that of the axially internal half-region L2. The hollow/solid ratio of half-region L2 is lower than or equal to 0.29.

At least one of the circumferential rows 9, 10, 11 comprises circumferential grooves extending over at least 80% of the row width. Preferably, the transverse grooves extend over the whole width of the row so as to define blocks.

In detail, row 9 includes a series of blocks 13, row 10 includes a series of blocks 14 and row 11 includes a series of blocks 15. Tread 2 (FIG. 2) has a hollow/solid ratio of about 0.27 in the circumferential block row 9; a hollow/solid ratio of about 0.3 in the circumferential block row 10; a hollow/solid ratio of about 0.36 in the circumferential block row 11; and a hollow/solid ratio of about 0.2 in the shoulder portion 12. The differentiated hollow/solid ratio on the two sides, i.e. lower on the outer side and higher on the inner side of the tyre, assists behaviour of the car running on a dry road surface, above all when a High Performance car is concerned in which greater camber angles are adopted that make the footprint of the casing (tread) asymmetric.

Each block 13 of the circumferential row 9 is axially delimited by two stretches of circumferential grooves 103 and 104 and circumferentially delimited by two transverse grooves 16.

In the preferred embodiment shown in FIGS. 1-2b, each transverse groove 16 extends from the axially outermost circumferential groove 3 to the adjacent circumferential groove 4. Each transverse groove 16 has a median line provided with at least one first rectilinear stretch 107 and one curvilinear connecting stretch 108.

The median lines of two transverse grooves 16 whatever, that are circumferentially consecutive, have a parallel course at least in a portion of their extension. Preferably, said median lines have a parallel course over the whole extension thereof.

Still in the preferred embodiment shown in the above mentioned FIGS. 1-2b, the median lines of the transverse grooves 16 have a second rectilinear stretch 106 and the curvilinear stretch 108 is such positioned as to join the first 107 and second 106 rectilinear stretches together.

The second rectilinear stretch 106 has a length smaller than or equal to one third of the length of the first stretch 107.

The curvilinear stretch 108 is defined by an arc of a circumference having a preselected radius of curvature R1 included in the range of 5 to 15 mm, preferably of 9 to 12 mm.

The curvilinear connecting stretch 108 joins the first 107 and second 106 rectilinear stretches together so as to define a convexity oriented in a first circumferential direction, denoted by arrow F in FIG. 2. The first circumferential direction is opposite to the rolling direction of the tyre denoted by arrow A in FIG. 2.

The second rectilinear stretch 106 is substantially perpendicular to the equatorial plane 7. In other words, the second rectilinear stretch 106 forms an angle θ with the circumferential direction of the circumferential groove that is included between 75° and 105°.

The portion of block 13 at the curvilinear stretch 108 and at the second rectilinear stretch 106 is that ensuring more traction/braking to the block when the tyre is getting over a straight.

The first rectilinear stretch 107 is, instead, disposed in an inclined direction relative to the equatorial plane 7, so that it is less inclined as compared with the equatorial plane 7 of the first rectilinear stretch 106.

In particular, the first rectilinear stretch 107 forms an angle α relative to the direction of the circumferential groove 4 that is smaller than 50°. Preferably angle α is smaller than 40°. Preferably, the second rectilinear stretch 107 forms an angle α relative to the direction of the circumferential groove 4, that is greater than 20°, more preferably greater than 23°.

The first rectilinear stretch 107 has an extension greater than 40% of the width of block 13.

Such an arrangement and extension of the first rectilinear stretch 107 gives block 13 an optimal flexibility, at the same time ensuring braking/traction ability when the tyre is running on a bend.

The transverse grooves 16 have a constant width moving from the axially external circumferential groove 3 to the axially adjacent circumferential groove 4. The transverse grooves 16 have a smaller width than that of the circumferential grooves 3, 4, 5, 6. In detail, the transverse grooves 16 have a width smaller than 1.5 mm, preferably smaller than 1 mm, more preferably smaller than or equal to 0.8 mm.

Such a reduced size of grooves 16 ensures a high amount of "rubber on the ground" at the row 9 of blocks 13, therefore a low hollow/solid ratio and, as a result, excellent handling qualities and low noise.

Grooves 16, as shown in FIG. 2b, further have a decreasing depth from the axially external groove 3 to the adjacent circumferential groove 4. In particular, the transverse grooves 16 have a depth with a step-wise course. In other words, as shown in chain line in FIG. 2b, they have a region of reduced depth 38 close to the axially innermost circumferential groove 4.

Depth of grooves 16 is preferably less than 9 mm. At the portion with reduced depth 38, placed close to the circumferential groove 4, grooves 16 have a depth less than 3 mm, of 2 mm for example.

This step-wise course of grooves 16 gives rigidity to block 13 at a sharp corner thereof so as to eliminate or at all events reduce the uneven wear typically concerning these portions.

In any case, grooves 16 could have a constant width without departing from the protection scope of the present invention.

To further reduce the possibility that an uneven wear of the block may initiate and consequently noise problems connected with this type of wear may take place, at the sharp corners of the block, grooves 16 have a bevel 78 close to the circumferential groove 4.

Adjacent to the circumferential groove 4, still as shown in FIG. 2, there is the row 10 of blocks 14.

The row 10 of blocks 14 is obtained through a 180° rotation of the pattern of the row 9 of blocks 13 relative to the circumferential groove 4. In detail, the block row 10 is disposed substantially astride the equatorial plane 7 and axially extends over at least 20%, but less than 40%, of the central portion L1.

Each block 14 of row 10 is axially delimited by two stretches of circumferential grooves 204, 205 that are axially spaced, and circumferentially delimited by two transverse grooves 26 that are circumferentially spaced and extend over at least 80% of the width of the circumferential row 10.

In the preferred embodiment shown in FIGS. 1-2b, each transverse groove 26 extends from the axially outermost circumferential groove 4 to the adjacent circumferential groove 5. Each transverse groove 26 has a median line provided with at least one first rectilinear stretch 207 and one curvilinear connecting stretch 208.

The median lines of two circumferentially consecutive transverse grooves whatever 26, have a parallel course at least on a portion of their extension. Preferably, said median lines have a parallel course over the whole extension thereof.

Still in the preferred embodiment shown in the above mentioned FIGS. 1-2b, the median line of the transverse grooves 26 has a second rectilinear stretch 206 and the curvilinear stretch 208 is such positioned as to join the first 207 and second 206 rectilinear stretches together. The first 207 and second 206 rectilinear stretches of the second circumferential row 10 have different lengths.

The curvilinear stretch 208 of each groove 26 is defined by an arc of a circumference having a preselected radius of curvature R2 included in the range of 5 to 15 mm, preferably of 9 to 12 mm.

The curvilinear connecting stretch 208 joins the first 207 and second 206 rectilinear stretches together, so as to define a convexity oriented in a second circumferential direction, denoted by arrow M in the figure and opposite to the first circumferential direction F.

In this case too the portion of block 14 at the curvilinear stretch and at the second rectilinear stretch described above is that ensuring more traction/braking to the tyre running on a straight.

The first rectilinear stretch 207 is disposed in an inclined direction relative to the equatorial plane 7 and is less inclined than the equatorial plane of the second rectilinear stretch 206.

In particular, the first rectilinear stretch 207 forms an angle β smaller than 50°, preferably smaller than 40°, relative to the direction of the circumferential groove. Preferably, the first rectilinear stretch 207 forms an angle β greater than 20°, more preferably greater than 23°, relative to the direction of the circumferential groove 4. The first rectilinear stretch 207 extends over at least 40% of the width of block 14.

Such an arrangement and extension of the first rectilinear stretch 207 gives the block 14 an optimal flexibility, at the same time ensuring braking/traction ability when the tyre is running on a bend.

The second rectilinear stretch 206 is substantially perpendicular to the equatorial plane 7. In other words, the second rectilinear stretch 207 forms an angle δ with the circumferential direction of the circumferential groove 7 which is included between 75° and 105°.

The transverse grooves 26 have a constant width moving from the axially outermost circumferential groove 4 to the axially adjacent circumferential groove 5. The transverse grooves 26 have a smaller width than that of the circumferential grooves 3, 4, 5, 6. In detail, the transverse grooves 26 have a width smaller than 1.5 mm, preferably smaller than 1 mm, more preferably smaller than or equal to 0.8 mm.

Each groove 26 has a decreasing depth starting from grooves 4, 5 towards its central region. In particular, the transverse grooves 20 have a double-step course with reduced depth so as to form two raised portions 45, towards the circumferential grooves 4 and 5.

The depth of grooves 26 of row 10 in the central region is constant and smaller than 9 mm, preferably equal to 7 mm. At the raised portions 45, placed close to the circumferential grooves 4 and 5, grooves 26 have a depth smaller than 3 mm, preferably equal to 2 mm. This course of grooves 26 gives rigidity to block 14 in an axial direction.

At all events, grooves 26 could have a constant depth over the whole extension thereof without departing from the protection scope of the present invention.

To reduce the possibility that an uneven wear of the block may initiate and consequently noise problems connected with this type of wear may arise, at the sharp corners of block 14, a bevel 79 is present.

Adjacent to the circumferential groove 5 there is the block row 11. In detail, the block row 11 is axially spaced towards the inside relative to the equatorial plane 7.

Each block of said row 11 is axially delimited by two stretches of circumferential grooves 305, 306 that are axially spaced and is circumferentially delimited by two transverse grooves 36 that are circumferentially spaced.

Each transverse groove 36 extends from the axially innermost circumferential groove 5 to the adjacent circumferential groove 6 and has a median line having a substantially rectilinear course.

The median lines of the transverse grooves 36 that are circumferentially consecutive and therefore adapted to define a block 15 have a substantially parallel course over at least one portion of their extension. Preferably, said median lines have a parallel course over the whole extension thereof.

The median line of each groove 36 is disposed in an inclined direction relative to the equatorial plane 7. In particular, the median line of each groove 36 forms an angle φ relative to the direction of the circumferential groove 5 smaller than 95°, preferably smaller than 90°.

Preferably, the median line of each groove 36 forms an angle φ relative to the direction of the circumferential groove 5 greater than 70°, more preferably greater than 75°.

The transverse grooves 36 separating blocks 15 of rows 11 substantially have a constant width moving from the circumferential groove 5 to the axially adjacent circumferential groove 6. The transverse grooves 36 have a smaller width than that of the circumferential grooves 3, 4, 5, 6, but at all events greater than that of the transverse grooves 16 and 26. In detail, the transverse grooves 36 have a width less than 4 mm, preferably less than 3 mm. Preferably, grooves 36 in any case have a width greater than 1.5 mm, preferably greater than 2 mm.

Given the size of the transverse grooves 36 and the circumferential grooves 5, 6, and consequently the hollow/solid ratio that is higher in this region than in the rest of the tyre, this region allows optimal water draining and more resistance to the aquaplane phenomenon.

To give tyres 15 more structural stability, in favour of easy drive, quietness on running and wear evenness, blocks 15 can be connected with each other by reinforcing elements 31 located in grooves 36. In more detail, taking into account the longitudinal section of a groove 36, as shown in FIG. 2b, each reinforcing element 31 can be defined by a portion of reduced depth provided at the central region of the respective transverse groove 36. Depth of the transverse groove 36 at the central region, i.e. of element 31, can be just as an indication included between 1.5 mm and 6 mm, and be preferably equal to 4 mm.

In the remaining portion, groove 36 has a varying depth increasing from grooves 5 and 6 towards the reinforcing element 31. In detail, close to the circumferential grooves 5 and 6, groove 36 has a depth included between 6 and 9 mm, preferably equal to 8 mm.

Each block 15 is further divided into two sub-blocks 15', 15" by a further groove 46.

Sub-block 15" substantially has an L-shaped conformation, while sub-block 15' enclosed by the two arms forming the L conformation substantially has a trapezium shape.

Each groove 46 extends from the circumferential groove to the transverse groove 36 and has a median line with a first rectilinear stretch 406, a second rectilinear stretch 407 and a curvilinear connecting stretch 408 joining the first 406 and second 407 rectilinear stretches together.

The curvilinear stretch 408 of each groove 46 is defined by an arc of a circumference having a preselected radius of curvature R3 equal to the radius of curvature R1.

The first rectilinear stretch 406 has a course substantially parallel to that of the transverse grooves 36, while the second rectilinear stretch 407 forms an angle γ with a direction substantially parallel to the equatorial plane of a value higher than 5°, preferably lower than 20°, more preferably equal to 10°. The second rectilinear stretch 407 extends until a transverse groove 36 and joins the latter axially downstream of the reinforcing element 31.

Each groove 46 has a decreasing depth from grooves 5, to its central region. In particular, as better shown in FIG. 2b, the transverse grooves 46 have a double-step course with reduced depth towards grooves 5 and 36.

Depth of grooves 46 is lower than 9 mm, preferably equal to 7 mm. At the raised portions 35 or steps placed close to grooves 5 and 36, grooves 46 have a depth lower than 3 mm, preferably equal to 2 mm.

This step-wise course of grooves 46 gives rigidity to block 15 and reduces possible problems of uneven wear.

Grooves 46 have a width smaller than 1.5 mm.

Figure 3:
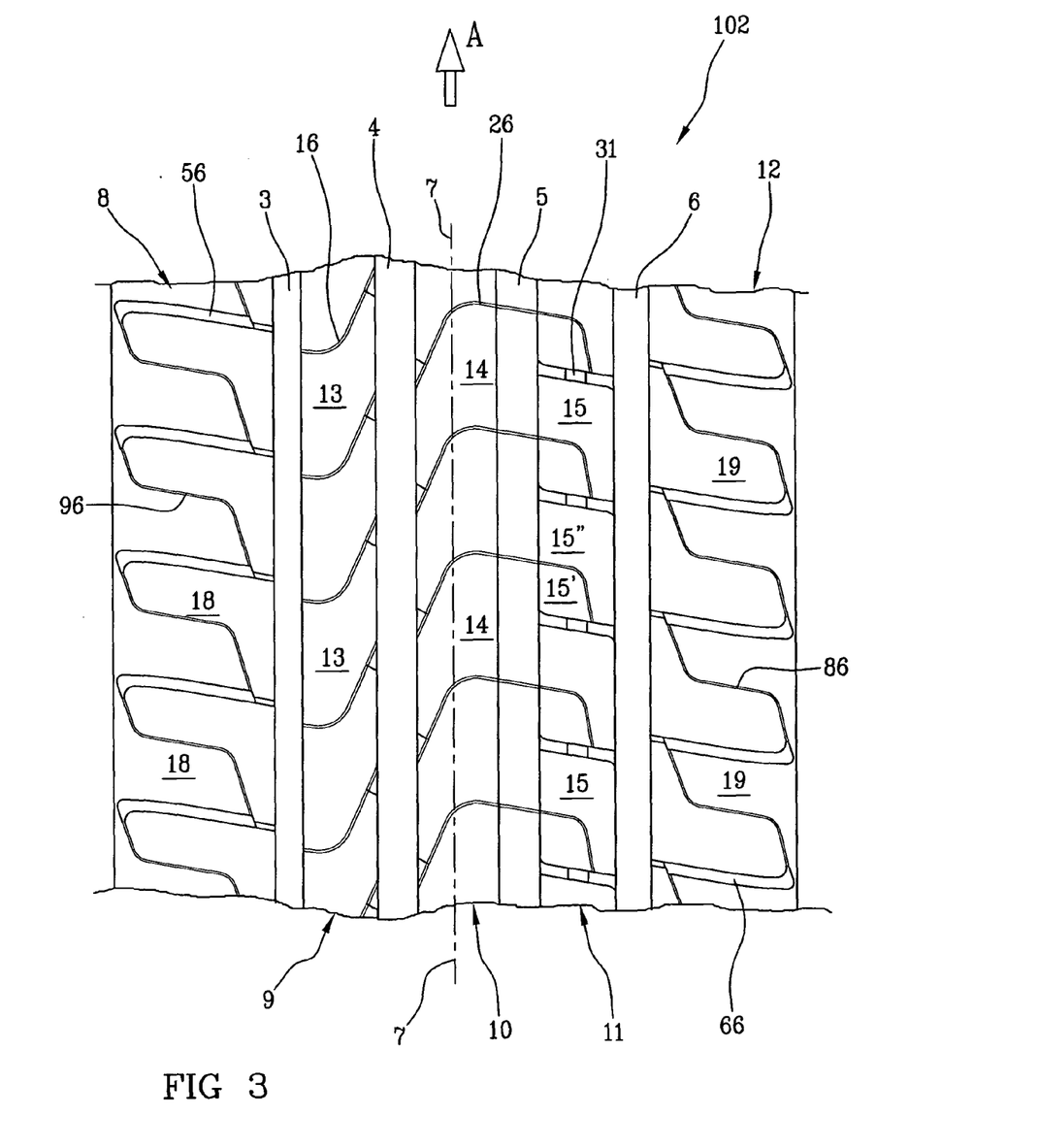
FIG. 3 is a plan view of a variant of the tread in FIG. 2.

Grooves 46 can continue into groove 5 for connection with grooves 26 so as to form a single groove, as shown in the embodiment in FIG. 3, for example.

As previously mentioned, the two shoulder portions 8 and 12 are axially limited relative to the central portion L1 of tread 2 by grooves 3 and 6, respectively.

Each shoulder portion 8 and 12 comprises transverse grooves 56 and 66, respectively.

The transverse grooves 56 and 66 repeat themselves circumferentially. The transverse grooves 56 and 66 have a median line with a substantially rectilinear course, substantially perpendicular to the equatorial plane 7.

In particular, the median line of grooves 56 form an angle ω greater than 70° with the circumferential direction of groove 3. In the embodiment shown in the figures said angle is smaller than 90° and preferably corresponds to 80°.

The median line of grooves 66 too is substantially oriented as the median line of grooves 56, forming therefore an angle ω greater than 70°. In the embodiment shown in the figures said angle ω is smaller than 90° and preferably corresponds to 80°.

Grooves 56 of the axially external shoulder 8 extend from the axially external edge of the tread band 2 until close to groove 3, without however reaching it.

On the contrary, grooves 66 of the axially internal shoulder 12 extend from the axially internal edge of the tread band 2 to groove 6. In detail, in the last stretch towards the circumferential groove 6, each transverse groove 66 has a section narrowing and passes from a width greater than 2 mm to a width smaller than 1.5 mm, preferably equal to 0.8 mm.

The transverse grooves 66 and grooves 56 in the stretch not submitted to narrowing have a width greater than 2 mm, preferably greater than 2.5 mm. Preferably, grooves 56, 66 have a width smaller than 4 mm.

Grooves 56, 66 do not have a constant depth, but a varying depth that decreases on moving towards the axially external edge of the tread band 2 as regards the circumferential groove 56 and towards the axially internal edge of the tread band 2 as regards the circumferential groove 66. The consecutive transverse grooves 56 as well as the consecutive grooves 66 are joined two by two by substantially longitudinal grooves 96, 86 having an S-shaped course. The longitudinal grooves 96, 86 have a median line with three right portions and two curvilinear portions.

Each curvilinear portion is disposed so as to join two rectilinear portions. Each longitudinal groove 96, 86 substantially extends from the axially external edge of tread 2 to the axially adjacent circumferential groove. In particular, each longitudinal groove 96 extends from the axially external edge of tread 2 until close to the axially internal end of the transverse groove 56.

Each longitudinal groove 86 substantially extends from the axially internal edge of the tread band 2 until close to the axially internal end of the transverse groove 66. In particular, the longitudinal groove 86 extends until close to the inner edge of the groove 66 of greater width.

In order to increase the structural rigidity of the shoulder blocks, the longitudinal grooves 96, 86 have a varying depth that decreases at the ends forming steps.

In particular, each longitudinal groove 96, 86 has a substantially constant depth which is more than 3 mm and less than 8 mm, preferably equal to 7 mm in the rectilinear stretch substantially perpendicular to the equatorial plane.

In the curvilinear connecting stretches and in the remaining substantially circumferential rectilinear stretches characterised by a depth reduction, the longitudinal grooves 96, 86 have a depth included between 1 mm and 5 mm, preferably equal to 2 mm.

However, the longitudinal grooves 96, 86 could have different depths without departing from the protection scope of the present invention.

In tread 2 the shoulder portion 8 has a hollow/solid ratio lower than that of the shoulder portion 12.

In FIG. 3 a tread 102 is shown that is a variant of that seen in FIG. 2 and in which the same parts are identified with same numbers. Tread 102 is quite similar to tread 2 except for the transverse grooves 56 of the outer shoulder portion 8. In this case, in fact, the transverse grooves 56 extend from the axially external edge of tread 102 to the circumferential groove 3, and the shoulder portion 8, like the shoulder portion 12, in this case has the same hollow/solid ratio.

In FIG. 3 the running direction is denoted by arrow A.

Figure 4:
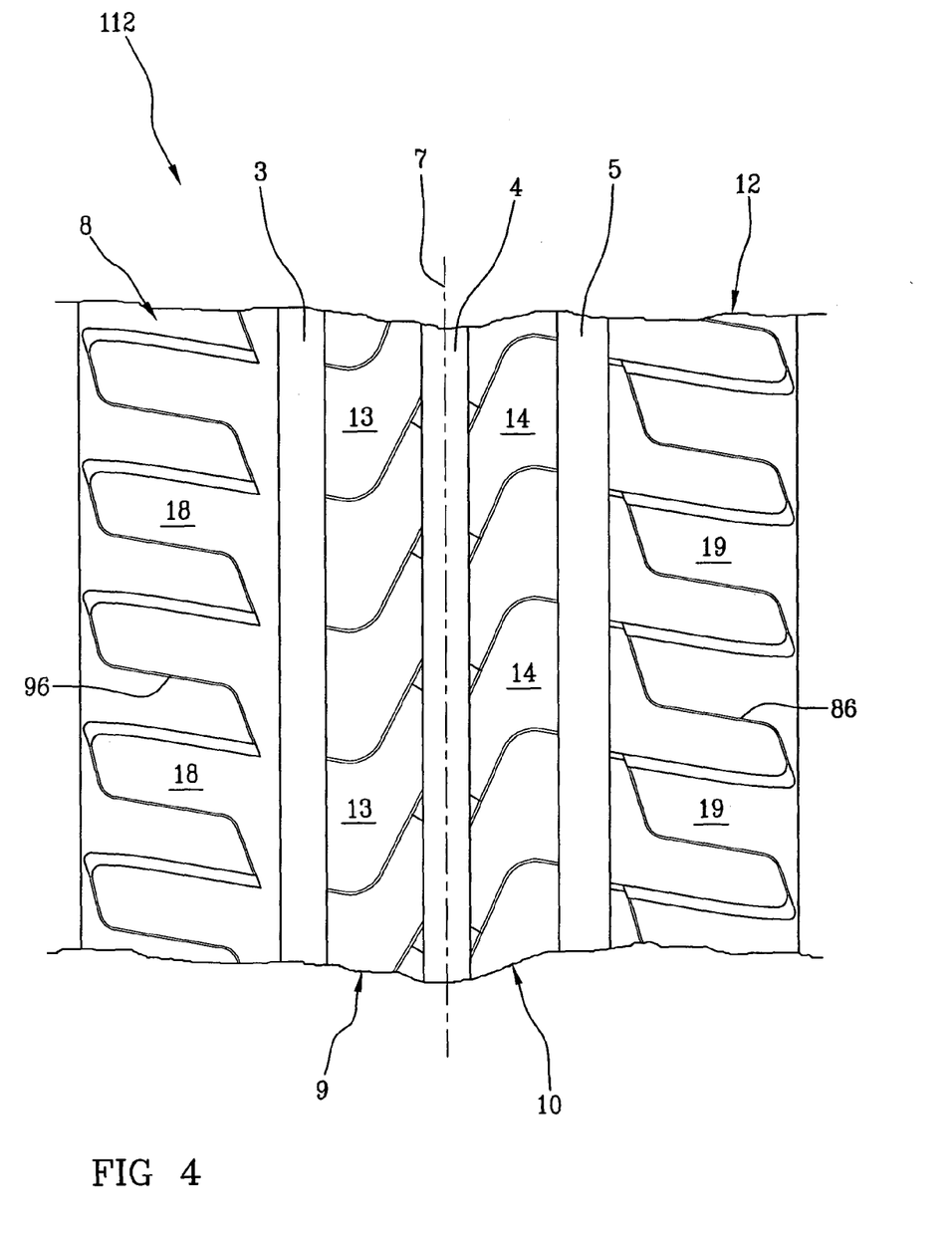
FIG. 4 is a plan view of an alternative embodiment of the tread in FIG. 2.

Shown in FIG. 4 is a tread 112 that is a further variant of that seen in FIG. 2 and in which the same parts are identified with same numbers.

In this case, tread 112 is provided with three circumferential grooves 3, 4, 5 (FIG. 4) extending in longitudinal direction and being parallel to an equatorial plane 7 of the tyre. Tread 112 includes two circumferential central rows 9, 10 of blocks. The shoulder portion 8 is separated from the block row 9 by the circumferential groove 3. The row 9 of blocks 13 is included between the circumferential grooves 3 and 4. The row 10 of blocks 14 is included between the circumferential grooves 4 and 5. The shoulder portion 12 is separated from the row 10 of blocks 14 by groove 5.

The circumferential grooves 3, 4 and 5 all substantially have the same width, included between 9 and 14 mm.

The row of blocks 13 of tread 112 corresponds in shape and position to the homologous row in FIG. 2 and for this reason will not be further described.

As regards, instead, the row 10 of blocks 14, this block row corresponds in shape to the homologous block row in FIG. 2 but has a different position. In particular, the block row 10 seen in FIG. 4 is axially spaced relative to the equatorial plane 7.

Figure 5:
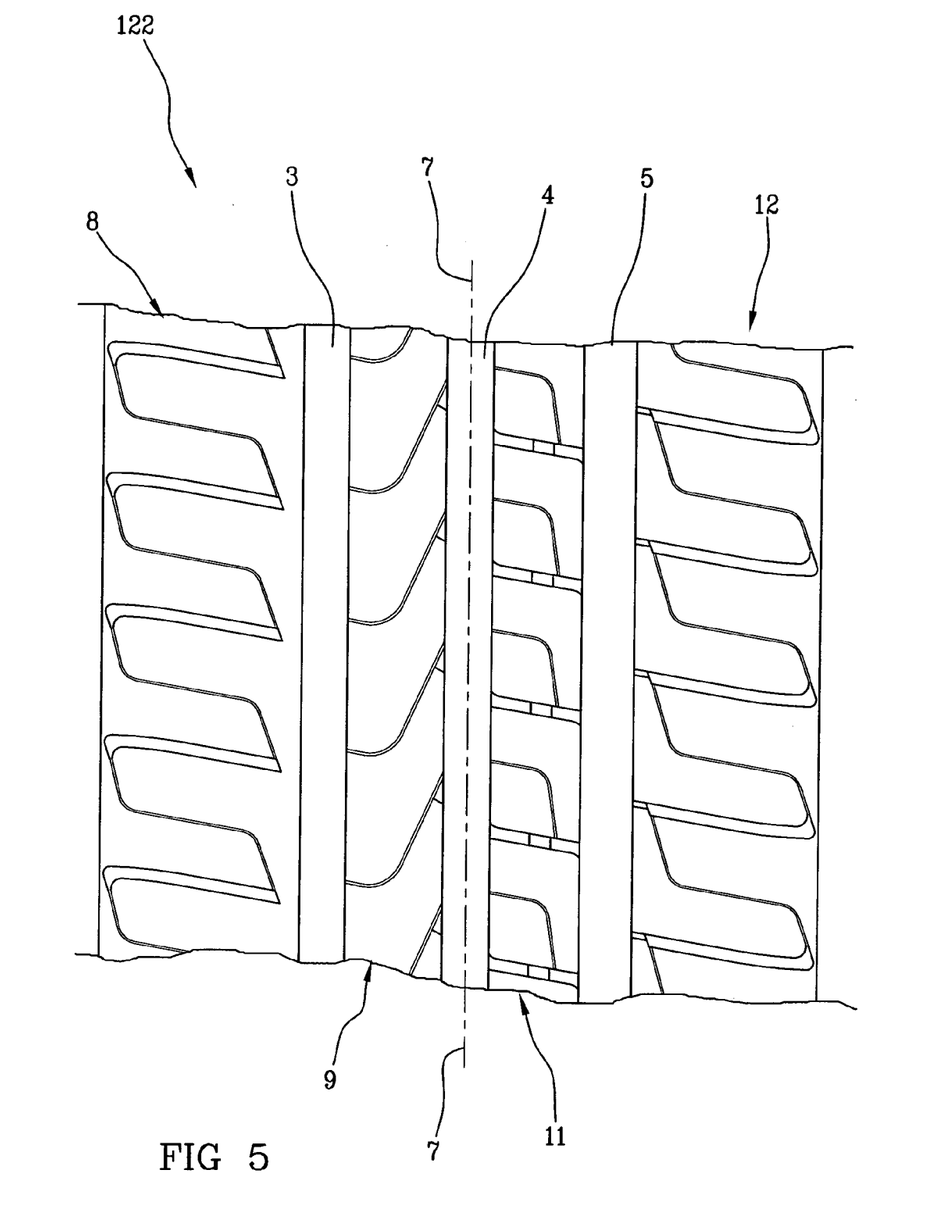
FIG. 5 is a plan view of a further alternative embodiment of the tread in FIG. 2.

Finally, shown in FIG. 5 is a tread 122 that is a variant of the one seen in FIG. 2 and in which the same parts are identified with the same reference numerals.

In particular, tread 122 in FIG. 5 is quite similar to the tread in FIG. 4 except that the row 10 of blocks 14 has been replaced by the row 11 of blocks 15.

Row 11 of blocks 15 corresponds in shape to the homologous block row in FIG. 2 and for this reason will not be further described.

The row 11 of blocks 15 shown in FIG. 5 is only axially displaced to a more centred position. In this way, relative to the tread in FIG. 4, the tread seen in FIG. 5 has a differentiated hollow/solid ratio on the two sides, i.e. a lower ratio on the outer side and a higher ratio on the inner side.

A specimen of the tyre of the invention having the tread 2 shown in FIGS. 1-2 was manufactured and submitted to comparison tests with a control tyre P having a tread with a central portion separated from two circumferential grooves by two shoulder portions. Said central portion has a row of central blocks and two side ridges provided with transverse grooves of curvilinear extension.

The control tyre P was selected because it has optimal features and was homologated for fast High Performance sports cars.

The tyre of the invention had size 225/50 R17, with rim 7.5×19J and inflating pressure of 2.2 bars. The control tyre had the same size.

A car Audi A6 was first equipped with four pneumatic tyres of the invention and then with four pneumatic tyres for comparison (control tyres).

Aquaplane tests were carried out on a straight and on a bend, as well as braking tests on a dry and wet road surface, behaviour tests during running on a wet and dry road surface, noise tests at the inside and outside of the car and comfort tests.

The aquaplane test on a straight took place on a straight stretch of smooth asphalt of a predetermined length (100 m) with a water layer of predetermined constant height (7 mm) which was automatically restored after each passage of the tested car. The straight is taken at constant speed (about 70 km/hour) under full-grip conditions and then the car is accelerated until loss of the full-grip conditions.

The aquaplane test on a bend took place on a travel stretch with smooth dry asphalt at a bend with a constant radius (100 m) having a predetermined length and comprising, at a final stretch, a region of predetermined length (20 m) flooded with a water layer of predetermined thickness (6 mm). The test took place at constant speed for different speed values.

During the test, maximum centrifugal acceleration and maximum speed of the car corresponding to the complete-aquaplane condition were measured.

The braking test was carried out on a straight asphalt stretch, both under wet and dry ground conditions, detecting the stop distance from a predetermined starting speed, typically 100 km/h under dry conditions and 80 km/h under wet conditions. The stop distance is determined as the arithmetic mean of a series of subsequent detecting operations.

The behaviour test on running under conditions of dry and wet surfaces takes place along predetermined paths of travel, typically circuits closed to traffic.

Through simulation of some characteristic manoeuvres (such as change of lane, Overtaking, slalom between traffic cones, getting in and out of bends) carried out at constant speed, as well as while accelerating and decelerating, evaluation of the tyre performance is carried out by the test driver who gives a numeric evaluation of the concerned tyre during the above described manoeuvres.

The assessment scale represents a subjective judgement expressed by the test driver who tests and compares the equipment items in sequence.

Comfort was evaluation taking into account the assembly of sensations felt by the test driver relative to the tyre capability of absorbing the roadway unevennesses.

The test results are reproduced in Table I where the assessment values are set out in percentage, considering the control tyre's values equal to 100.

TABLE I

|  | Control | Invention |
| --- | --- | --- |
| Aquaplane on a bend | 100 | 100 |
| Aquaplane on a straight | 100 | 100 |
| Braking on a dry ground | 100 | 107 |
| Braking on a wet ground | 100 | 102 |
| Behaviour on a dry ground | 100 | 105 |
| Behaviour on a wet ground | 100 | 102 |

In Table I, values greater than 1 denote an improvement as compared with the control tyre.

The test results prove that the tyre of the invention has a quite better behaviour than the control tyre in the braking tests and behaviour tests on a dry ground.

Figure 6:
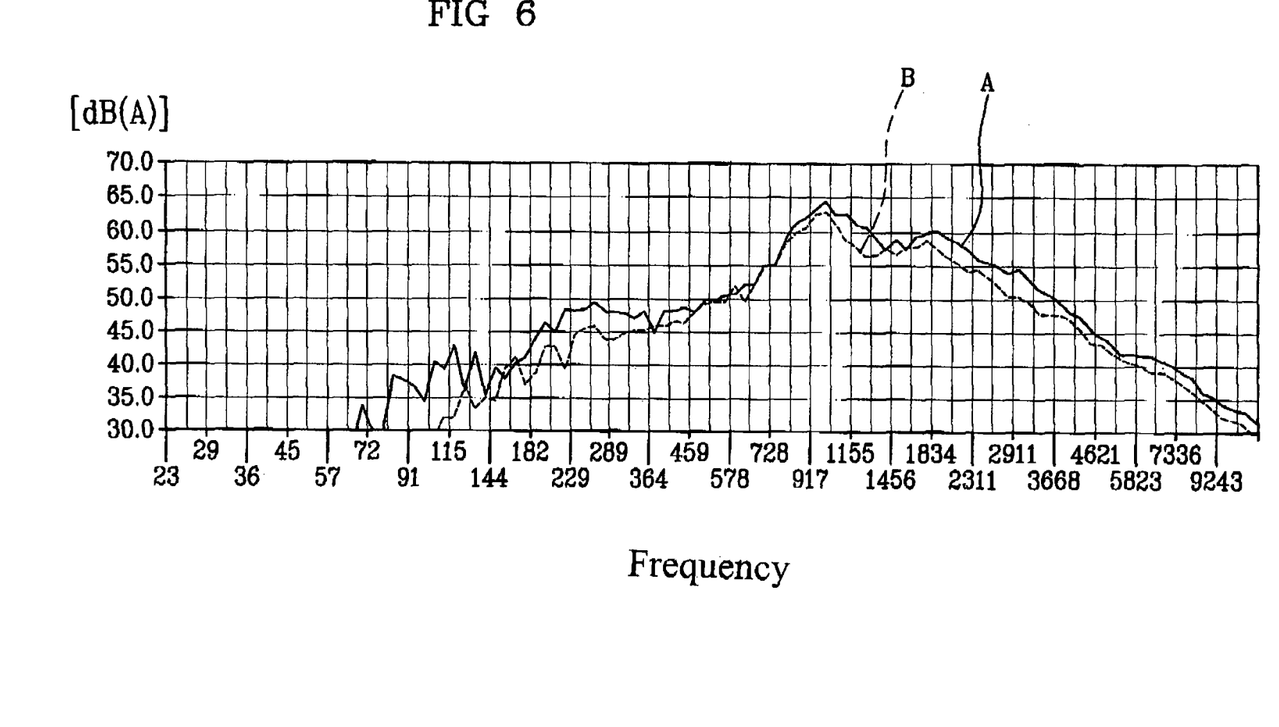
FIG. 6 shows the noise spectra of a tyre of the invention and a reference tyre at about 80 km/hour.

Shown in FIG. 6 are the graphs of the outside noise intensity dB(A) depending on the frequency, for the tyre of the invention (curve B) and the control tyre (curve A). As known, in these tests the reference speed is 80 km/h.

The graphs in FIG. 6 show that the tyre of the invention appears to be less noisy than the control tyre by about 2 dB(A) on an average.

The invention claimed is:

1. A pneumatic tyre comprising a tread comprising a central portion disposed astride an equatorial plane and two shoulder portions, the central portion being separated from the shoulder portions of the tread by two circumferential grooves; said central portion comprising at least one circumferential row between two circumferential grooves wherein said tread has a hollow/solid ratio less than 0.28; said circumferential row comprises transverse grooves extending over at least 80% of the width of said circumferential row; each transverse groove comprises a median line having at least one first rectilinear stretch and one curvilinear stretch; said transverse grooves having a smaller width than that of the circumferential grooves; wherein the equatorial plane divides the tread into two half-regions, an axially internal half-region and an axially external half-region positioned on an outer side of a car, when said tyre is mounted thereon, said axially external half-region has a hollow/solid ratio less than that of the axially internal half-region, and said axially internal half-region has a hollow/solid ratio less than or equal to 0.28.

2. The pneumatic tyre as claimed in claim 1, wherein said median line has a second rectilinear stretch and said curvilinear stretch connects said first and a second rectilinear stretches.

3. The pneumatic tyre as claimed in claim 2, wherein said second rectilinear stretch has a length less than, or equal to one third of the length of the first stretch.

4. The pneumatic tyre as claimed in claim 1, wherein said transverse grooves have a maximum width less than or equal to 1.5 mm.

5. The pneumatic tyre as claimed in claim 1, wherein said transverse grooves extend from a circumferential groove to an axially adjacent groove.

6. The pneumatic tyre as claimed in claim 1, wherein said circumferential row comprises a row of blocks, each block of the row being axially delimited by a stretch of said circumferential grooves and being circumferentially confined by two consecutive transverse grooves.

7. The pneumatic tyre as claimed in claim 2, wherein a connecting stretch comprises an arc of a circumference having a preselected radius of curvature and defines a convexity oriented in a first circumferential direction.

8. The pneumatic tyre as claimed in claim 1, wherein said first stretch extends over at least 40% of the width of the circumferential row and has a preselected inclination relative to said equatorial plane.

9. The pneumatic tyre as claimed in claim 2, wherein said second stretch has a direction substantially perpendicular to said equatorial plane.

10. The pneumatic tyre as claimed in claim 9, wherein said first stretch forms an angle relative to said equatorial plane that is less than or equal to 50°.

11. The pneumatic tyre as claimed in claim 1, comprising at least one second circumferential row between two circumferential grooves; said circumferential row comprising transverse grooves extending over at least 80% of the width of said circumferential row; each transverse groove comprising a median line having a first rectilinear stretch and one curvilinear connecting stretch; said transverse grooves having a smaller width than the width of said circumferential grooves.

12. The pneumatic tyre as claimed in claim 11, wherein said median line of the transverse grooves of the second circumferential row has a second rectilinear stretch, and in that said curvilinear stretch connects said first and a second rectilinear stretches.

13. The pneumatic tyre as claimed in claim 12, wherein said first and second rectilinear stretches of the second circumferential row have different lengths.

14. The pneumatic tyre as claimed in claim 11, wherein said first stretch extends over at least 40% of the width of the circumferential row and has a preselected inclination relative to said equatorial plane.

15. The pneumatic tyre as claimed in claim 14, wherein said first stretch forms an angle relative to said equatorial plane that is less than or equal to 50°.

16. The pneumatic tyre as claimed in claim 12, wherein said second stretch has a preselected inclination relative to said equatorial plane adapted to define an angle greater than 75°.

17. The pneumatic tyre as claimed in claim 11, wherein said curvilinear connecting stretch comprises an arc of a circumference having a preselected radius of curvature and defines a concavity oriented in a second circumferential direction.

18. The pneumatic tyre as claimed in claim 17, wherein said second circumferential direction is opposite to said first circumferential direction.

19. The pneumatic tyre as claimed in claim 11, wherein said transverse grooves of the second circumferential row have a maximum width less than or equal to 1.5 mm.

20. The pneumatic tyre as claimed in claim 11, wherein said transverse grooves of the second circumferential row extend from one circumferential groove to an axially adjacent circumferential groove.

21. The pneumatic tyre as claimed in claim 11, wherein said second circumferential row comprises a row of blocks, each block of the second row being axially delimited by a stretch of the circumferential grooves and being circumferentially delimited by two consecutive transverse grooves.

22. The pneumatic tyre as claimed in claim 19, wherein the width of said transverse grooves is less than or equal to 1 mm.

23. The pneumatic tyre as claimed in claim 1, comprising at least one third circumferential row of blocks between two circumferential grooves, each of said blocks being axially defined by a stretch of said circumferential grooves and being circumferentially defined by transverse grooves, said transverse grooves comprising a median line of substantially rectilinear course adapted to form an angle with said equatorial plane.

24. The pneumatic tyre as claimed in claim 23, wherein said transverse grooves extend from one circumferential groove to an axially adjacent circumferential groove with a width greater than 1.5 mm and less than 4 mm.

25. The pneumatic tyre as claimed in claim 23, wherein said third row of blocks comprises a further groove capable of being adapted to divide the block into two sub-blocks; said further groove comprising a median line having a first and a second rectilinear stretch and one curvilinear connecting stretch joining said first and second rectilinear stretches together, said groove having a width less than 1.5 mm.

26. The pneumatic tyre as claimed in claim 1, wherein said circumferential grooves have a width of 5 to 16 mm, inclusive of the extremes.

27. The pneumatic tyre as claimed in claim 1, wherein said circumferential grooves have a depth of 5 to 11 mm.

28. The pneumatic tyre as claimed in claim 1, wherein said circumferential groove disposed at an axially external portion of the central portion of the tread has a smaller width than the width of the circumferential grooves.

29. The pneumatic tyre as claimed in claim 1, wherein the transverse grooves have a depth reduction in a portion adjacent to at least one circumferential groove.

30. The pneumatic tyre as claimed in claim 1, wherein an axially internal row of blocks of the central portion of the tread has a hollow/solid ratio of 0.28 to 0.38.

31. The pneumatic tyre as claimed in claim 1, wherein each shoulder portion comprises transverse grooves that repeat circumferentially.

32. The pneumatic tyre as claimed in claim 31, wherein the transverse grooves have a median line of substantially rectilinear course, which is inclined relative to the equatorial plane so as to form an angle greater than 70° with the circumferential direction of an axially adjacent groove.

* * * * *